United States Patent [19]

Mizusawa et al.

[11] 4,394,892
[45] Jul. 26, 1983

[54] AUTOMATED BRAKING-GAP ADJUSTER SYSTEM FOR MECHANICAL DRUM BRAKE

[75] Inventors: Mitsutoyo Mizusawa, Ueda; Masayuki Seki, Tateshina; Kazuo Sunohara, Ueda, all of Japan

[73] Assignee: Nisshin Kogyo Kabushiki Kaisha, Ueda, Japan

[21] Appl. No.: 246,185

[22] Filed: Mar. 23, 1981

[30] Foreign Application Priority Data

| Mar. 31, 1980 | [JP] | Japan | 55-41863 |
| Mar. 31, 1980 | [JP] | Japan | 55-42952[U] |
| Mar. 31, 1980 | [JP] | Japan | 55-42953[U] |
| Mar. 31, 1980 | [JP] | Japan | 55-42954[U] |
| Mar. 31, 1980 | [JP] | Japan | 55-42955 |
| Jan. 27, 1981 | [JP] | Japan | 56-9110[U] |

[51] Int. Cl.³ ............................................. F16D 65/56
[52] U.S. Cl. ........................ 188/196 BA; 188/79.5 R; 188/79.5 K; 188/329
[58] Field of Search ............... 188/79.5 R, 79.5 GE, 188/79.5 K, 79.5 S, 79.5 SC, 79.5 SS, 196 BA, 196 V, 327, 328, 343, 329

[56] References Cited

U.S. PATENT DOCUMENTS

| 1,832,135 | 11/1931 | Oliver | 188/327 |
| 2,093,931 | 9/1937 | Sawtelle | 188/79.5 SC |
| 2,198,878 | 4/1940 | Main | 188/79.5 SC |
| 2,259,075 | 10/1941 | Main | 188/79.5 SC |
| 2,490,135 | 12/1949 | Jenkins | 188/79.5 SC |
| 3,113,466 | 12/1963 | Osborne | 188/327 |
| 3,851,737 | 12/1974 | Hewins | 188/196 BA |
| 3,920,102 | 11/1975 | Ito | 188/196 BA |
| 3,942,827 | 3/1976 | Warlop et al. | 188/196 BA |
| 4,057,128 | 11/1977 | Coupland | 188/196 BA |
| 4,180,146 | 12/1979 | Airheart | 188/196 BA |

FOREIGN PATENT DOCUMENTS 864832 5/1941 France .

Primary Examiner—Douglas C. Butler
Assistant Examiner—R. Diefendorf
Attorney, Agent, or Firm—Cantor and Lessler

[57] ABSTRACT

An automated braking-gap adjuster system for mechanical drum brakes includes back plate, a pair of brake shoes having one end pivotally supported on the back plate, a cam member interposed between the other free ends of the brake shoes and adapted to be rotated by a brake arm and a wedge adjuster having its tapered cam surface slidingly abutting directly or indirectly upon the brake shoes. The wedge adjuster is disposed in the cam member such that it is rotatable with the cam member and slidable in the direction extending at right angles with the expanding direction of the brake shoes. The adjuster system also includes an adjusting rod abutting upon the wedge adjuster and threadedly connected to the cam member and an adjusting gear engaged with the adjusting rod and rotated to extend threadedly the adjusting rod, so that the wedge adjuster is urged to thereby expand the brake shoes.

17 Claims, 12 Drawing Figures

AUTOMATED BRAKING-GAP ADJUSTER SYSTEM FOR MECHANICAL DRUM BRAKE

BACKGROUND OF THE INVENTION

The present invention relates to an automated braking-gap adjuster system for a mechanical drum brake including a back plate, a pair of brake shoes having one end pivotally supported on the backplate and a cam member interposed between both free ends of the shoes and extending through the back plate, said brake being designed to be put in operation by turning the cam member through a brake arm to expand the brake shoes and thereby urge them upon the inner periphery of a brake drum.

In the prior art automated braking-gap adjuster system of such a type, a cam adapted to expand brake shoes by its rotation is sequentially regulated to a different angle of rotation with the progress of abrasion of linings to provide automatic adjustment of a braking-gap between a brake drum and the surfaces of the linings. Accordingly, the amount of rotation of a brake arm needed for effecting sufficient braking increases with increases in the abrasion loss of the linings, leading to increases in the amount of rotation of the cam. This also results in increases in the stroke of a brake lever or pedal which, in turn, cause a malfunction of the brake. A problem also arises when the angle of rotation of the cam departs from the upper limit of a normal range, since the brake will then malfunction or will not work at all. Further, since the angle of rotation of the cam and hence the point of application thereof varies even in a normal range due to repeated adjustment, difficulties may occasionally be encountered in keeping the operation of the brake constant depending upon the braking action of the brake arm.

SUMMARY OF THE INVENTION

In view of the above-mentioned problems, it is therefore a main object of the present invention to provide an automated braking-gap adjuster system characterized by including a back plate, a pair of brake shoes having one end pivotally supported on the back plate, a cam member interposed between the other free ends of the brake shoes and designed to be rotated by a brake arm, a wedge adjuster adapted to be rotated integrally with the cam member and having its tapered cam surfaces taking sliding abutment directly or indirectly onto the brake shoes, an adjusting rod threadedly connected to the cam member, which rod is disposed in the direction at right angles with the expanding direction of the brake shoes and abuts onto the wedge adjuster, and an adjusting gear engaging the adjusting rod, said adjusting rod being threadedly extended by rotation of said adjusting gear to urge said wedge adjuster and thereby expand said brake shoes. According to the present invention, as the linings wear away, the adjusting gear is rotated so that the adjusting rod is threadedly extended, whereby a push is given to the wedge adjuster with its tapered cam surfaces abutting slidably upon the brake shoes, and the brake shoes are expanded for adjustment. Upon release of braking, the cam member rotatable together with the brake arm and the wedge adjuster are invariably restored to an initial position for the brake arm to provide automatic compensation for a braking-gap such that the gap is always kept constant. After the completion of adjustment, the angle of rotation of the brake arm is maintained at a preset value so that there is no change in the stroke of a brake lever or pedal. Thus, the brake is in stable and sure operation without causing such problems as mentioned above.

Another object of the present invention is to provide a version of the automated braking-gap adjuster system characterized in that an adjusting gear engaged with an adjusting rod by the critical abrasion length is rotated depending upon the abrasion loss of linings to extend threadedly the adjusting rod, whereby a wedge adjuster having its cam surfaces taking sliding abutment onto brake shoes is urged to provide expanding of the brake shoes for adjustment. According to this version, adjustment of a braking-gap can surely be effected until disconnection of the adjusting gear out of the adjusting rod occurs. Upon the abrasion of the linings reaching a critical value, the adjustment of a braking-gap is suspended by allowing disconnection of the gear out of the rod. This leads to increases in the stroke of a brake lever or pedal, thus warning a driver on the seat of the replacement of the linings by new ones.

A further object of the present invention is to provide an automated braking-gap adjuster system characterized by including a cam member having a hollow portion, a wedge adjuster having cam surfaces and disposed such that it is rotatable with the cam member and slidable in the direction extending perpendicularly to the expanding direction of the brake shoes, windows formed in the sides of the cam member which face the end faces of the brake shoes, cam collars provided apart from or integrally with the brake shoes, which collars are slidingly mounted in the windows in the expanding direction of the brake shoes and brought into abutment with the cam surfaces of the wedge adjuster, an adjusting rod threadedly connected to the cam member such that it abuts upon the wedge adjuster, and an adjusting gear rotated with the progress of abrasion of linings to extend threadedly the adjusting rod from the cam member threaded thereinto and thereby urge the wedge adjuster, whereby the cam collars disposed slidingly in the windows of the cam member are moved in the expanding direction of the brake shoes to expand the brake shoes for adjustment, and characterized in that, upon release of braking, the cam member rotatable with the brake arm and the wedge adjuster are invariably restored to an initial position for the brake arm. According to this aspect of the present invention, a braking-gap is automatically compensated such that it is always kept constant. After the completion of adjustment, the angle of rotation of the brake arm can be maintained at a preset value so that there is no change in the stroke of a brake lever or pedal, thus assuring stable operation of the brake. In addition, it is possible to provide effective prevention of deformation, failures etc. of the end faces of the brake shoes, which may otherwise be caused by the rotation of the cam during braking.

A still further object of the present invention is to provide an automated braking-gap adjuster system characterized in that an adjusting rod abutting upon a wedge adjuster is threadedly connected to a cam member, an adjusting gear mating with the adjusting rod is provided with a gear section, a resilient pawl of an adjusting lever fixed to a brake arm or the cam member is engaged with the gear section such that the adjusting gear can be rotated only in the adjusting direction, and a resilient pawl of an adjusting stopper fixed to a back plate is engaged with the gear section such that the adjusting gear can be kept from turning in a non-adjusting direction whereby the adjusting gear can be rotated surely and smoothly with the progress of abrasion of linings to provide threaded extension of the adjusting rod to thereby urge a wedge adjuster having its cam surfaces abutting slidingly upon brake shoes, so that the brake shoes are expanded for adjustment; and, upon release of braking, the cam member rotatable with the brake arm and the wedge adjuster are invariably restored to an initial position for the brake arm; and, when an excessive braking force is applied on the brake arm during braking, a reaction force resulting from the brake shoes urged against the inner periphery of a brake drum is transmitted to the adjusting rod and the cam member via the wedge adjuster, whereby the adjusting rod and the adjusting gear are rotated together in the non-adjusting direction of the brake arm. According to this aspect of the present invention, the adjusting gear can be operated surely and smoothly so that a braking-gap is automatically compensated in such a manner to keep it constant. After the completion of adjustment, the angle of rotation of the cam is maintained at a preset value without any changes in the stroke of a brake lever or pedal, thus assuring stable and sound operation of the brake. Further, even when an excessive braking force is produced, it is possible to permit effective prevention of over-adjustment.

A still further object of the present invention is to provide an automated braking-gap adjuster system for a mechanical drum brake characterized in that a support member for a cam member is provided with a locating means to which moving parts or members are touchingly locked to eliminate a gap between the cam member and a wedge adjuster slidingly mounted thereon, whereby initial location of the moving parts is attained. According to this aspect of the present invention, the cam member is kept at a slightly rotated state, so that the wedge adjuster can be turned shortly upon rotation of the cam member associated with the pivotal movement of a brake arm. A braking-gap is automatically compensated such that it is always kept constant. After the completion of adjustment, the angle of rotation of the brake arm is maintained at a preset value without any changes in the stroke of a brake lever or pedal, thus assuring stable and sound operation of the brake.

A still further object of the present invention is to provide an automated braking-gap adjuster system for a mechanical drum brake characterized in that a wedge adjuster having cam surfaces is provided in a hollow portion of a cam member rotatable with a brake arm such that it is rotatable with the cam member and slidable in the direction extending perpendicularly to the expanding direction of brake shoes, the end faces of the brake shoes take abutment onto the cam surfaces of the wedge adjuster, a keep plate for the brake shoes is attached to a back plate by mounting means such as bolts such that the brake shoes are movable only in the expanding direction of the brake shoes, and an adjusting rod taking abutment onto the wedge adjuster is threadedly connected to the cam member, whereby the adjusting gear is rotated to extend threadedly the adjusting rod and thereby urge the wedge adjuster, so that it is always kept constant. According to this aspect of the present invention, a braking-gap is automatically compensated such that it is kept constant. After the completion of adjustment, the angle of rotation of the brake arm is maintained at a preset value without any changes in the stroke of a brake lever or pedal, thus assuring stable operation of the brake. The cam member used is of simple construction and easy to manufacture, and the keep plate permits the brake shoes to be surely moved only in the expanding direction of the brake shoes as well. In addition, assembling of the cam member, brake shoes and keep plate is effected with ease but improved efficiency.

BRIEF DESCRIPTION OF THE DRAWINGS

The above-mentioned and other objects of the present invention will become apparent from a reading of the following description with reference to the accompanying drawings.

FIGS. 1 to 5 show one preferred embodiment of the automated braking-gap adjuster system for a mechanical drum brake according to the present invention, wherein:

FIGS. 6 to 9 show another embodiment of the automated braking-gap adjuster system for a mechanical drum brake according to the present invention, wherein;

FIGS. 10 to 12 show still another embodiment of the automated braking-gap adjuster system for a mechanical drum brake according to the present invention, wherein:

DETAILED DESCRIPTION

Figure 1:
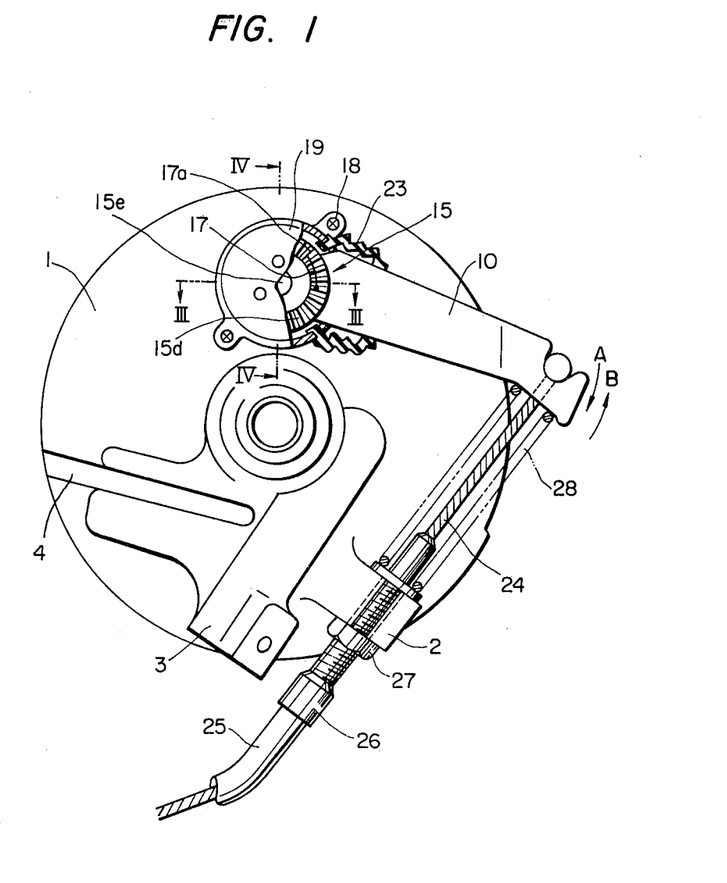
FIG. 1 is a front view.
Figure 2:
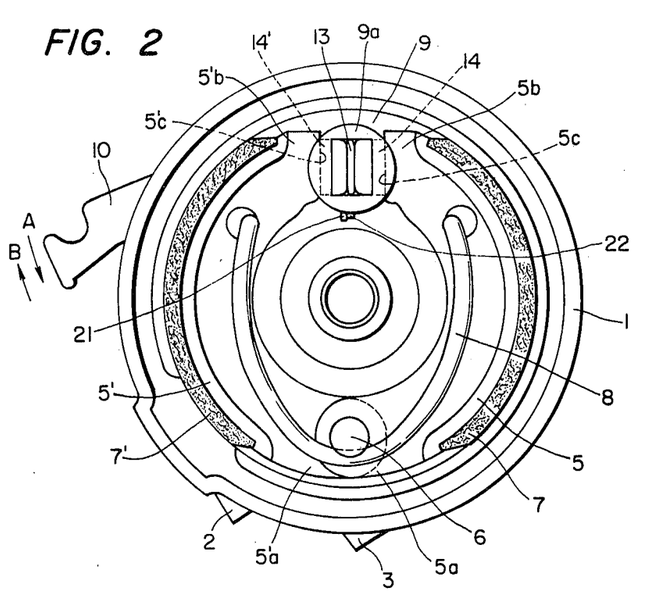
FIG. 2 a rear view.

Referring to the drawings, there is shown a preferred embodiment of the automated braking-gap adjuster system according to the present invention, including a back plate 1 which is provided on the inside with a mount 2 for attaching a wire for operation of a brake, a mount 3 for attaching a speedometer cable and a groove 4 in which is to be fitted a projection (not shown) formed on part of the framework of an automobile for receiving a braking torque. A pair of brake shoes 5, 5' have their one ends 5a, 5'a pivotally supported on the inside of the back plate 1 by an anchor pin 6. Linings 7, 7' are fixedly applied over the brake shoes 5, 5'. A substantially U-shaped shoe return spring 8 has its intermediate portion wound around the anchor pin 6 and its both ends locked to the brake shoes 5, 5'.

Figure 5:
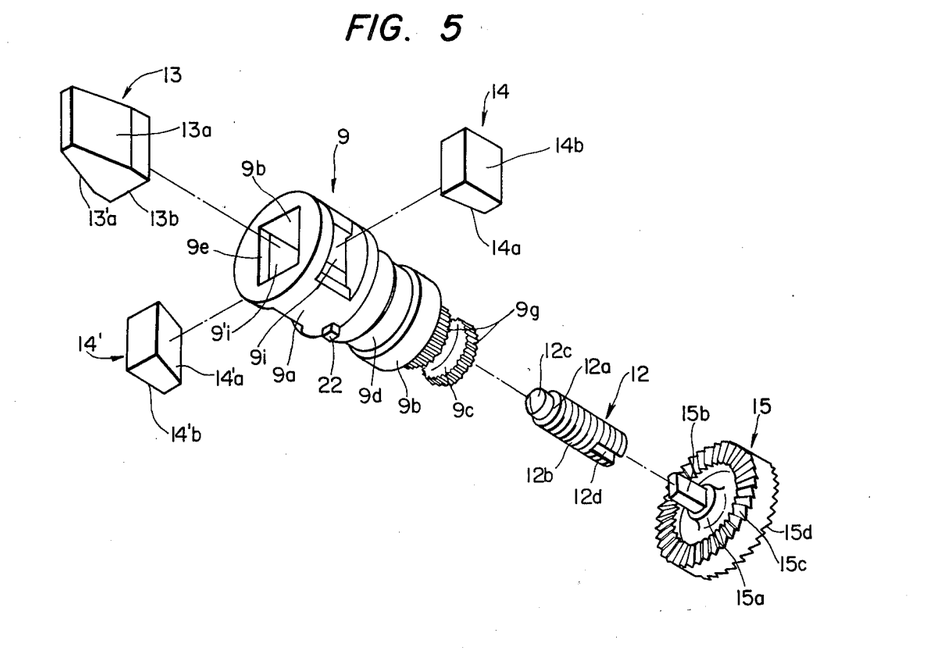
FIG. 5 an exploded perspective view of the cam member, adjusting rod, wedge adjuster, cam collars and ajusting gear.

As seen from FIG. 5, a cam member shown generally at 9 comprises a housing 9a, a mounting shaft 9b and a serrated shaft 9c. The shaft 9b is rotatably supported on the back plate 1 between the free ends 5b and 5'b of the brake shoes 5 and 5'. Smooth rotation of the cam member 9 is assured by an amount of grease stored in a reservoir 9d. The cam member 9 is rectangularly hollowed from the housing 9a to the intermediate portion of the shaft 9b as shown at 9e, and the serrated shaft 9c is axially provided in the hollow portion with a left-hand female thread 9f reaching the hollow 9e.

A brake arm 10, adapted to rotate the cam member 9, mates with a serration of 9g of the shaft 9c projecting over the back plate 1, and is fixed in place by an arm bolt 11.

An adjusting rod 12 formed on its shaft 12a with a left-hand male thread 12b has at its free end a projection 12c having a semi-spherical head and at its rear end a slitting portion 12d. This rod is in threaded engagement with the femalethread 9f of the cam member 9.

A wedge adjuster 13 having tapered cam surface 13a, 13'a on its both sides is fitted over the inner wall 9h of the hollow 9e formed in the cam member 9 with its end face 13b taking abutment onto the projection 12c of the rod 12 at the recession 13c. The wedge adjuster 13 rotates integrally with the cam member 9, and is forced to move in the direction at a right angle with the widening direction of the brake shoes 5, 5' by providing threaded extension of the adjusting rod 12. In this connection, it may be possible to provide direct engagement of the wedge adjuster 13 with the adjusting rod 12 without forming the recession 13c into which is fitted the end of the projection 12c of the adjusting rod 12.

Cam collars 14, 14' are provided such that they are slidable in rectangular windows 9i, 9'i in the widening direction of the brake shoes 5, 5', said windows being formed in the side walls of the housing 9a of the cam member 9, which are opposite to the end faces 5c, 5'c of the brake shoes 5, 5'. These collars are adapted to engage slidably the cam surface 13a, 13'a of the wedge adjuster 13 on the inner tapered surfaces 14a, 14'a formed opposite thereto. On the other hand, the outsides 14b, 14'b of the collars 14, 14' are designed to abut onto As best illustrated in FIG. 5, an adjusting gear shown generally at 15 includes a shaft 15a having a projection 15b extending by the same length as the critical abrasion length of the linings. The gear 15 is rotatably mounted on the cam member 9 by allowing the extension 15b to be in fitting engagement with the slitting portion 12d of the adjusting rod 12 threadedly connected to the female thread 9f of the member 9. With rotation of the adjusting gear 15 in the adjusting direction, the adjusting rod 12 rotates and extend threadedly toward the hollow 9e. The adjusting gear 15 is then provided on the inside and outside with a gear section 15c operable as an adjuster and a gear section 15d as a stopper, respectively, said sections inclining in the braking direction of the brake arm 10.

Figure 3:
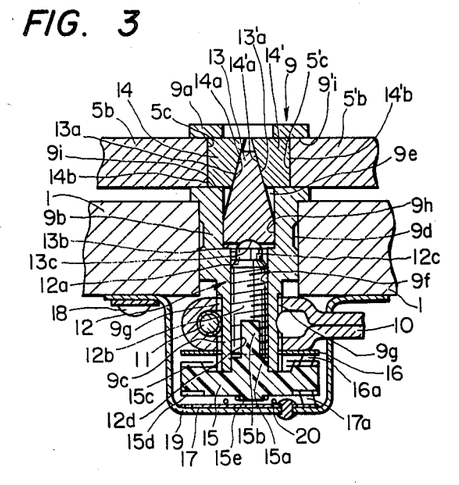
FIG. 3 a sectional view taken along the line III—III.
Figure 4:
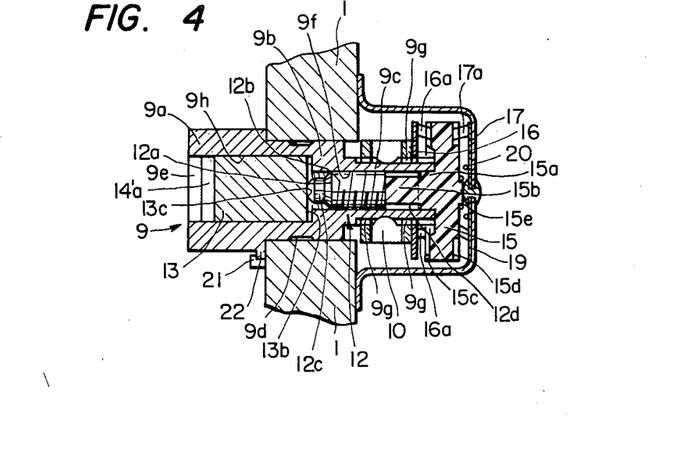
FIG. 4 a sectional view taken along the line IV—IV of FIG. 1.

As best shown in FIGS. 3 and 4, an adjusting lever indicated generally at 16 is fixed to the serrated shaft 9c of the cam member 9, and includes a resilient pawl 16a which is adapted to mate with the gear section 15c to turn the adjusting gear 15 in the adjusting direction and assure turning of the brake arm 10 in the braking direction. The adjusting lever 16 may be secured to the brake arm 10.

Turning to FIG. 1, an adjusting stopper shown generally at 17 is fixed to a cover 19 mounted on the back plate 1 by means of a screw 18, and includes a resilient pawl 17a which is adapted to mate with the gear section 15d operable as a stopper to allow turning of the adjusting gear 15 only in the adjusting direction, but keep it from rotating in the non-adjusting direction.

A conical spring 20 is supported on a seat 15e formed on the adjusting gear 15 and interposed biasedly between the adjusting gear 15 and the cover 19 to make sure adjusting operation of the adjusting gear 15, as schematically illustrated in FIGS. 3 and 4. Such a conical spring may be disposed of, on condition that the resilient pawl 17a of the adjusting stopper 17 has a resilient force greater than that of the resilient pawl 16a of the adjusting lever 16, and that, when rotating in the adjusting direction, the adjusting gear 15 is designed to clear the teeth of the gear section 15d operable as a stopper.

A locating lug 21 is formed on the back plate 1, and a locking lug 22 to take abutment onto the first-mentioned lug is formed on the cam member 9. These lugs render location of the cam member 9 easy during assembling, and allows the cam member 9 to be slightly rotated to a position which is defined as an initial position thereof. This renders it possible to rotate the wedge adjuster 13 shortly upon turning of the cam member 9 in the braking direction, since working errors between the wedge adjuster 13 and the inner wall 9h of the hollow 9e formed in the cam member 9 and a gap causing sliding movement of the adjuster 13 are eliminated so that the angular positions of the adjuster 13 abut on the inner wall 9h.

A dust boot 23 is provided between the cover 19 and the brake arm 10, and a brake wire 24 is provided having its one formed with a brake lever or pedal (not shown) and its other end connected to the end of the brake arm 10. A case 25 for the brake wire 24 is attached to the mount 2 by means of an adjusting bolt 26 and a nut 27. A brake arm return spring 28 is wound around the brake wire 24 and interposed biasedly between the mount 2 and the end of the brame arm 10. The spring force of this spring 28 permits the brake arm 10 to return to the initial position upon braking.

In what follows, reference will be made to the operation of the adjuster system according to the foregoing embodiment.

Upon putting on the brake by operation of a brake lever or pedal, the brake arm 10 is rotated through the brake wire 24 in the direction indicated by an arrow A in FIG. 1 and, with rotation of this arm, the cam member 9, the cam collars 14, 14' engaging that member and the wedge adjuster 13 are rotated in one piece in the counterclockwise direction in FIG. 2, thereby to force open the end faces 5c, 5'c of the brake shoes 5, 5' taking abutment onto the outsides of the cam collars 14, 14'. The brake shoes 5, 5' were then widened against the action of the shoe return spring 8 so that the linings 7, 7' abut tightly upon the brake drum (not shown). The angle of rotation of the brake arm is then restrained to a range over which the resilient pawl 16a of the adjusting lever 16 slides on the incline of the same tooth of the gear section 15c operable as an adjuster, so that there is no possibility that the pawl 16a goes over the tooth. In addition, a rotational force applied on the adjusting gear 15 in the clockwise direction in FIG. 1 is restricted by the resilient pawl 17a of the adjusting stopper 17, so that no clockwise turning of the adjusting gear 15 takes place.

Upon release of braking, the brake shoes 5, 5' are restored to the original positions by the return spring 8 and, corespondingly, the cam member 9, the cam collars 14, 14' and the wedge adjuster 13 are rotated in one piece to the original positions in the clockwise direction in FIG. 2. The brake arm 10 is also turned under the action of the return spring 28 in the direction of an arrow B in FIG. 1 and returns to the initial position.

Upon repetition of braking, the linings 7,7' wear away to such an extent that there is a braking-gap exceeding a preset value between the inner periphery of the brake drum and the surfaces of the linings 7, 7'. In this case, the adjusting gear 15 is restricted by the resilient pawl 17a of the adjusting stopper 17 in respect of its rotation associated with turning of the brake arm 10, with the result that the resilient pawl 16a of the adjusting lever 16 goes over one tooth of the gear section 15a of the adjusting gear 15, and the adjusting rod 12 extends threadedly in the left-hand direction. Associated with this, the cam collars 14, 14' are urged upon the cam surfaces 13a, 13'a of the wedge adjuster 13 and move in the widening direction of the brake shoes 5, 5' for the completion of adjustment. Upon release of braking, the brake arm 10, the cam member 9, the cam collars 14, 14' and the wedge adjuster 13 are rotated in one piece in the counterclockwise direction in FIG. 1. The adjusting gear 15 is also revolved by the resilient pawl 16a in the counterclockwise direction, so that the resilient pawl 17a of the adjusting stopper 17 goes over one tooth, thus allowing counterclockwise rotation of the adjusting gear 15 which, in turn, mates with the next tooth. In this way, the resilient pawl 16a and the adjusting gear 15 are put in sustained engagement with each other, thus providing adjustment of the braking-gap between the inner periphery of the brake drum and the surfaces of the linings 7, 7'.

Accordingly, as the linings wear off, the pawl 16a of the adjusting lever 16 mates in sequence with the teeth of the gear section 15a of the adjusting gear 15 with the adjusting rod 12 extending threadedly in the left-hand reaction, so that the brake-gap is automatically regulated until disconnection of the adjusting rod 12 out of the projection 15b of the adjusting gear 15 occurs.

Upon the linings 7, 7' reaching the critical abrasion, there occurs disconnection of the adjusting rod 12 out of the projection 15b of the adjusting gear 15. As a consequence, rotation of the adjusting gear 15 is permitted, but yet neither turning nor threaded extension of the adjusting rod 12 takes place, thus providing an adjustment of the braking-gap. This leads to increases in the stroke of the brake pedal, thus warning a driver on the seat of replacement of the linings 7, 7'.

When an excessive braking force is loaded upon the brake arm 10 in braking, i.e. when the brake shoes 5, 5' are urged upon the inner periphery of the brake drum and, thereafter, the brake arm 10 is subjected to an external force sufficient to cause deformation of the drum, the wedge adjuster 13 suffers a force component applied in the right-hand direction in FIGS. 3 and 4, as a reaction force results from the brake shoes 5, 5' urged upon the inner periphery of the brake drum. This causes that the left-hand male thread 12b of the adjusting rod 12 is urged tightly upon the left-hand female thread 9f of the cam member 9, and the adjusting rod 12 and gear 15 are rotated together with the cam member 9 in the clockwise direction in FIG. 1. Clockwise rotation of the adjusting gear 15 is then permitted by the elastic deformation of the pawl 17a of the adjusting stopper 17 without shifting the position at which the pawl 17a mates with the teeth of the gear section 15d of the adjusting gear 15. As such an excessive force decreases, the adjusting gear 15 is restored to the original position with no adjustment, thus resulting in effective prevention of any overadjustment.

While the abrasion losses of the linings 7, 7 are larger on the leading side rather than on the trailing side, the braking-gap can be kept constant on both sides since the brake shoe 5 on the leading side can be made wider than the brake shoe 5' on the trailing side by tapering the cam surface 13a of the wedge adjuster 13 on the leading side more sharply as compared with the cam surface 13'a on the trailing side.

Another embodiment of the present invention will now be explained with reference to FIGS. 6 to 9.

Figure 6:
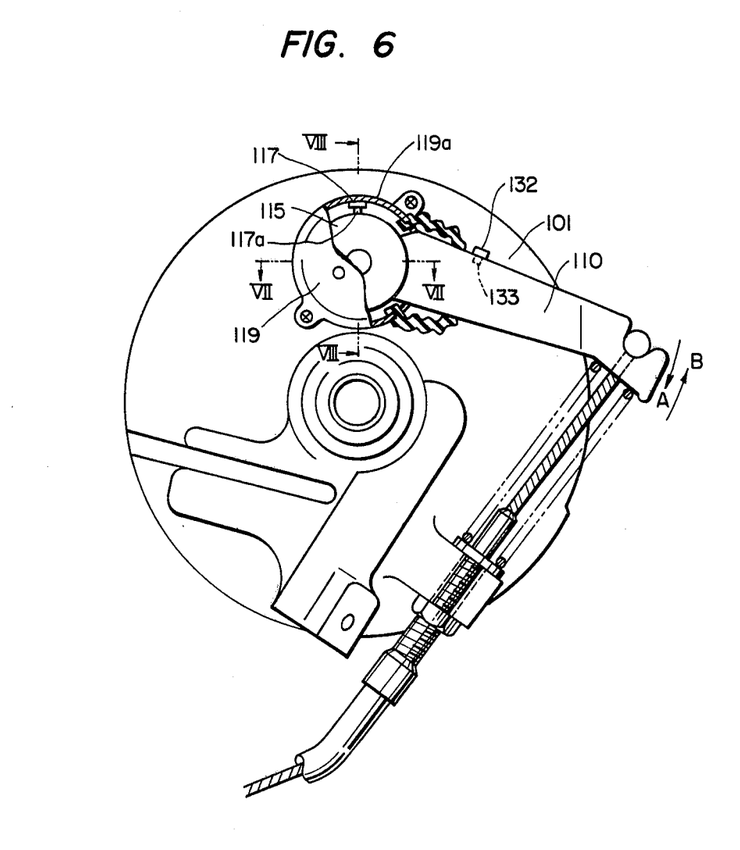
FIG. 6 is a front view.
Figure 7:
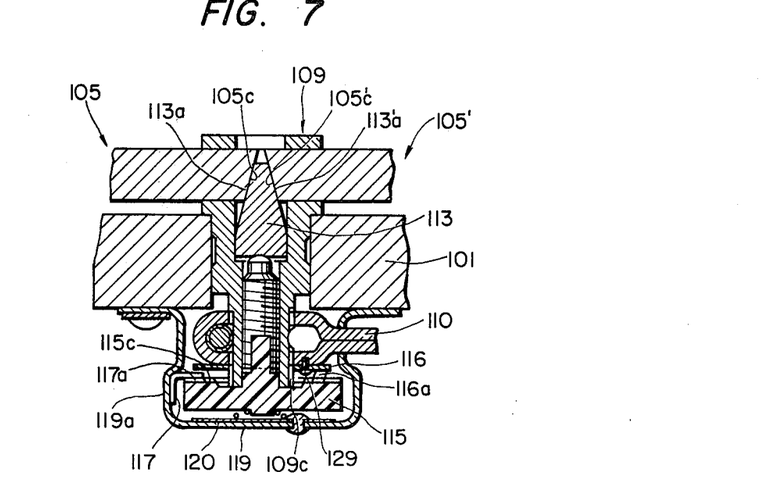
FIG. 7 a sectional view taken along the line VII—VII of FIG. 6.
Figure 8:
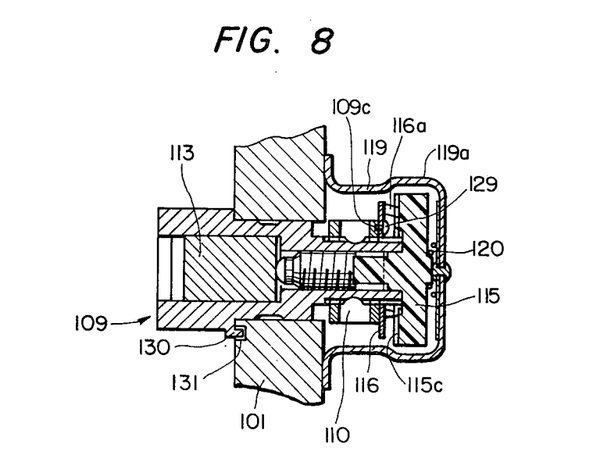
FIG. 8 a sectional view taken along the line VIII—VIII of FIG. 6.

This embodiment is designed to reduce the number of parts or member required by tilting the end faces 105c, 105'c of brake shoes 105, 105' in association with the inclined cam surfaces 113a, 113'a of a wedge adjuster 113 such that the end faces 105c, 105'c can take abutment directly onto the cam surfaces 113a, 113'a. An adjusting lever 116 is then extended without touching a serrated shaft 109c of a cam member 109, and fixed to a portion for attachment of a brake arm 110 by means of a screw 129. This lever includes a resilient pawl 116a in engagement with a gear section 115c formed on the inside of an adjusting gear 115.

A cover 119 is formed such as to have a slightly increased diameter in the vicinity of the adjusting gear 115, and fixedly provided on its portion 119a of larger diameter with an adjusting stopper 117 including a resilient pawl 117a in engagement with the gear section 115c.

Figure 9:
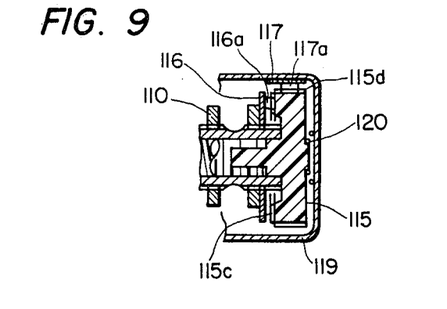
FIG. 9 a sectional view illustrating another embodiment of the engaged relationship between the adjusting gear and the pawls of the adjusting lever and stopper.

FIG. 9 shows another embodiment of the adjusting gear 115, which, as illustrated, has on its inside a gear section 115c operable as an adjuster in engagement with the resilient pawl 116a of the adjusting lever 116 and on its outer periphery a gear section 115d operable as a stopper in engagement with the resilient pawl 117a of the adjusting stopper 117. It is then required that the adjusting gear 115 be resiliently supported by a conical spring 120.

A locking lug 130 is formed on the cam member 109, and a locating recession 131 in the form of a groove is formed in a back plate 101. The locking lug 130 is fitted into the recession 131 such that it is movable with the rotation of the cam member 109 in the braking direction. The locking lug 130 is then touchingly locked to the end of the locating recession 131 to keep the cam member 109 in a slightly rotated state in the braking direction, which is defined as an initial position for the cam member 109.

In this embodiment, the back plate 101 serves as a support member for which any member adapted to support the cam member 109 may be applied, and the cam member 109 serves as a moving member for which any member adapted to be movable relative to the support members for the brake arm 110 etc. may be applied.

As illustrated in FIG. 6, it is essential in this case that a locating lug 132 is formed on the surface of the back plate 101, and a locking lug 133 formed on the rear surface of the brake arm 110, said locating lug being in abutting engagement with said locking lug. Alternatively, the brake arm 110 may take abutment directly upon the locating lug 132 on the side.

Figure 10:
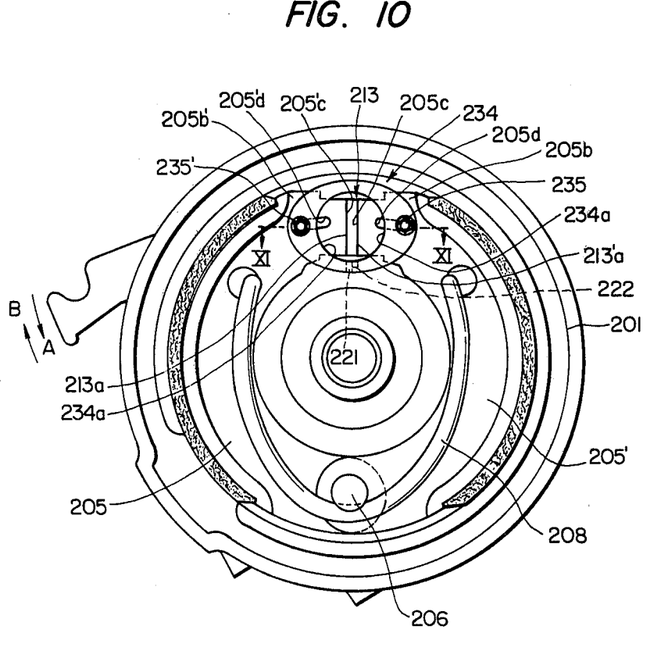
FIG. 10 is a rear view.
Figure 11:
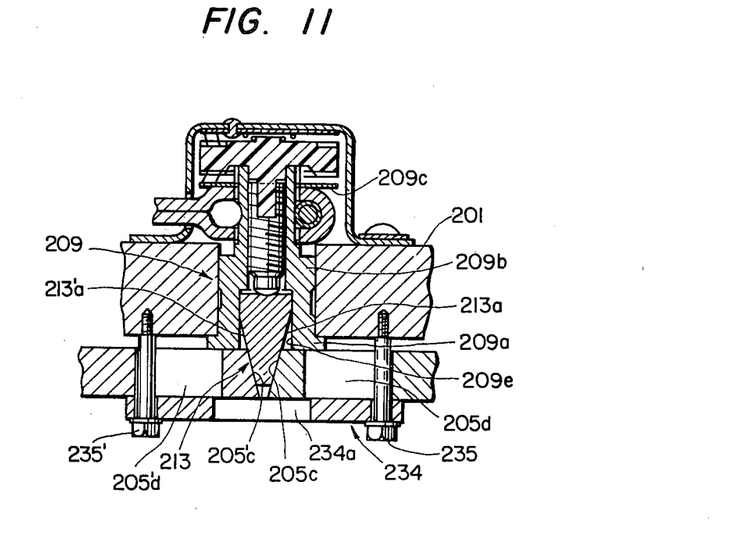
FIG. 11 a sectional view taken along the line XI—XI of FIG. 10.
Figure 12:
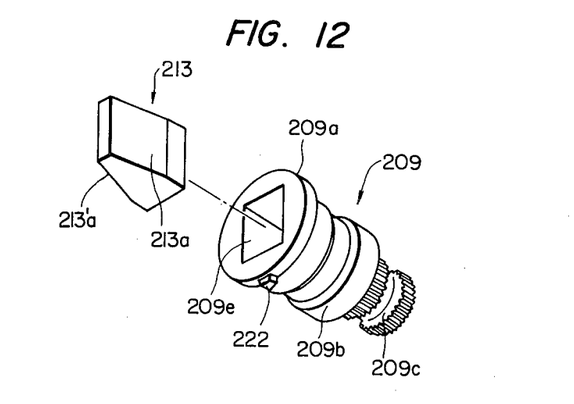
FIG. 12 an exploded perspective view of the cam member and wedge adjuster.

Still another embodiment of the present invention will now be explained with reference to FIGS. 10 and 12.

This embodiment is designed to simplify the structure of a cam member 209 and reduce the manufacturing cost by constructing the cam member 209 with a flange 209a, a mounting shaft 209b and a serrated shaft 209c in such a manner that the flange 209a is locked to a back plate 201, and the mounting shaft 209b is rotatably held in place. The end faces 205c, 205'c of brake shoes 205, 205' are then abutted directly upon the cam surfaces 213a, 213'a of a wedge adjuster 213 disposed in a hollow 209e of the cam member 209. An oval keep plate 234 for the brake shoes is provided, having therein stepped bolts 235, 235' inserted from its both ends, said bolts being threaded into the back plate 201 to locate the keep plate in front of the wedge adjuster 213. This plate is bored at 234a at the central portion to reduce the weight thereof. The stepped bolts 235, 235 ' are loosely inserted into arcuate guide slots 205d, 205'd formed in the ends 205b, 205'b of the brake shoes 205, 205', so that the brake shoes are expandable in a given direction. During adjustment, the keep plate 234 receives on its inside surface the forces brought about by the brake shoes 205, 205' in the rising direction as a result that the end faces 205b, 205'b are forced forward by the cam surfaces 213a, 213'a of the wedge adjuster 213. Since the brake shoes 205, 205' are then prevented from rising by an anchor pin 206 and a shoe return spring 208, they are slidable and expandable in a sure and smoothe manner without giving rise to increases in sliding resistance in the expanding direction. The cam member 209 is then mounted on the back plate 201 in a rotatable manner and, upon assembling of the brake shoes 205, 205', the keep plate 234 is fixed to the back plate 201 therethrough. Thus, assembling of the members is effected with ease but markedly improved efficiency. A locking lug 222 is formed on the flange 209a of the cam member 209, and abuts upon a locating lug 221 formed on the back plate 201.

It should be noted that the present invention is not only limited to the foregoing embodiments, but is also applicable to any types of mechanical drum brakes wherein a cam member extends through a back plate and is interposed between the free ends of a pair of brake shoes having its other ends pivotally supported on the plate, said cam membber being rotated in association with the pivotal movement of a brake arm for braking.

As will be understood from the foregoing explanation, the present invention had advantages over the prior art. With the progress of abrasion of linings, the adjusting gear is rotated to extend threadedly the adjusting rod from the cam member threaded thereinto and thereby urge the wedge adjuster the cam surfaces of which take sliding abutment directly or indirectly upon the brake shoes, whereby the brake shoes are expanded for adjustment. Upon release of braking, the cam member rotatable with the brake arm and the wedge adjuster are invariably restored to the initial position for the brake arm. Consequently, the braking-gap is compensated such that it remains constant. Even after the completion of adjustment, the cam surfaces of the wedge adjuster always abut directly or indirectly upon the brake shoes at the same position, so that, in braking, the angle of rotation of the brake arm is always maintained at a preset value without any changes in the stroke of a brake pedal or lever. This assures that a driver on the seat can always operate the brake in a satisfactory manner. The prior art system offers a problem in that it is impossible to assure stable operation of the brake in response to the predetermined braking action of the brake, since the angle of rotation of the cam and hence the point of application thereof varies as the linings wear away. According to the present invention, however, such inconvenience is not caused at all. There is also no possibility that the brake is put in improper or non-operation leading to accidents, since the angle of rotation of the cam is prevented from departing from a normal range. In addition, since the wedge adjuster is provided apart from the adjusting rod, any load applied on the wedge adjuster during braking is not transmitted from the adjusting rod to the adjusting gear. This helps prevent over-loading and failures of the adjusting gear, improper operation of the brake, etc.

Upon the linings wearing away and reaching a critical abrasion value, the adjusting rod extends threadedly to such a degree that disconnection of the adjusting gear therefrom takes place. Therefore, further adjustment of the braking-gap is avoided. A resultant increase in the stroke of a brake lever or pedal renders it easy for a driver on the seat to detect the time for the replacement of the linings.

In addition, since the end faces of the brake shoes are protected by allowing them to abut upon the cam surfaces of the wedge adjuster through the cam collars in an indirect manner rather than in a direct manner, it is possible to provide effective prevention of deformation, failures or the like thereof, which may otherwise be caused by braking. These collars are also guided smoothly into the windows of the cam member and permits positive expansion of the brake shoes in association with the progress of abrasion of the linings, thus assuring surer adjustment of the braking-gap and more positive operation of the brake.

Sure operation of the adjusting gear is also assured by the resilient pawls of the adjusting gear and stopper. Further, when an excessive braking power is applied on the braking arm during braking, a reaction force resulting from the brake shoes urged tightly upon the inner periphery of the brake drum causes the left-hand male thread of the adjusting rod to be urged closely upon the left-hand female thread of the cam member, whereby the adjusting lever and the adjusting gear are rotated in one piece in the braking direction of the brake arm. Such rotation of the lever and gear are permitted by deflection of the resilient pawl of the adjusting stopper without causing the resilient pawl of the adjusting lever to go over the teeth of the gear section operable as an adjuster, thus assuring effective prevention of over-adjustment.

The moving member is also designed to be brought into abutting engagement with the locating portion formed on the support member for the cam member to rotate slightly the cam member to a position which is defined as an initial position for the brake arm, according to the present invention. This helps eliminate a working error between the wedge adjuster and the inner wall of the hollow of the cam member and a gap that renders sliding movement of the wedge adjuster possible. As a result, the wedge adjuster rotates shortly upon rotation of the cam member in association with the pivotal movement of the brake arm in the braking direction, so that expansion of the brake shoes takes place. The prior art system has a disadvantage that, unless such a gap is eliminated, it is impossible to start putting on the brake, even though the cam member can be rotated by the operation of a brake lever or pedal. According to the present invention, however, such a disadvantage is not caused at all, thus assuring more rapid, surer and safer operation of the brake.

Furthermore, the cam member is constructed of the flange, mounting shaft and serrated shaft, and designed to receive touchingly in its hollow the ends of the brake shoes which is supported by the keep plate such that the brake shoes are movable in the expanding direction. This renders it possible to simplify the structure of the cam member and reduce the manufacturing cost. The keep plate also permits sure movement of the brake shoes only in the expanding direction. Thus, assembling of the cam member, the brakeshoes and the keep plate is effected with ease but greater efficiency.

What is claimed is:

1. An automated braking-gap adjuster system for mechanical drum brakes, including a back plate, a pair of brake shoes each having one end pivotally supported on the back plate, a cam member interposed between the other end of the brake shoes and adapted to be rotated by a brake arm, a wedge adjuster having its tapered cam surfaces taking sliding abutment upon the brake shoes, said adjuster being disposed in the cam member such that it is rotatable with the cam member and slidable at right angles to the direction of expansion of the brake shoes when braking, an adjusting rod abutting upon the wedge adjuster and threadedly connected to the cam member, and an adjusting gear engaged with said adjusting rod and rotated to cause said adjusting rod to move longitudinally so that said wedge adjuster is urged to thereby expand said brake shoes.

2. An automated braking-gap adjuster system for mechanical drum brakes as recited in claim 1, in which said adjusting gear is engaged with said adjusting rod for a distance equal to the critical abrasion length of the linings.

3. An automated braking-gap adjuster system for mechanical drum brakes as recited in claim 2, in which engagement of said adjusting gear with said adjusting rod is attained in a projection-recession fitting manner.

4. An automated braking-gap adjuster system for mechanical drum brakes, including a back plate, a pair of brake shoes having one end pivotally supported on the back plate, a cam member interposed between the other end of the brake shoes and adapted to be rotated by a brake arm, a wedge adjuster having cam surfaces, said adjuster being disposed in a hollow of the cam member such that it is rotatable with the cam member and slidable at right angles to the direction of expansion of the brake shoes when braking, windows formed in the sides of the cam member which are opposite to the end faces of the brake shoes, cam collars provided with the brake shoes, said collars being disposed in the windows such that they are slidable in the direction of expansion of the brake shoes and being caused to abut upon the cam surfaces of the wedge adjuster, an adjuster rod abutting upon the wedge adjuster and threadedly connected to the cam member, and an adjusting gear rotated to cause said adjusting rod to move longitudinally, so that said wedge adjuster is urged to thereby expand said brake shoes.

5. An automated braking-gap adjuster system for mechanical drum brakes, including a back plate, a pair of brake shoes having one end pivotally supported on the back plate, a cam member interposed between the other end of the brake shoes and adapted to be rotated by a brake arm, a wedge adjuster having its tapered cam surface taking sliding abutment upon the brake shoes, said adjuster being disposed in the cam member such that it is rotatable with the cam member and slidable at right angles to the direction of expansion of the brakes shoes when braking, an adjusting rod abutting upon the wedge adjuster and threadedly connected to the cam member, and adjusting gear engaged with the adjusting rod and formed with a gear section, an adjusting lever fixed to the brake arm or the cam member and having a resilient pawl engaged with said gear section such that said adjusting gear is rotatable only in the adjusting direction, and an adjusting stopper fixed to the back plate and having a resilient pawl engaged with said gear section such that said adjusting gear is kept from rotation in a non-adjusting direction, said adjusting gear being rotated to cause said adjusting rod to move longitudinally, so that said wedge adjuster causes said brake shoes to expand.

6. An automated braking-gear adjuster system for mechanical drum brakes as recited in claim 5, in which said adjusting gear is formed on its one side with a gear section which is engaged with the resilient pawls of said adjusting lever and said adjusting stopper.

7. An automated braking-gap adjuster system for mechanical drum brakes as recited in claim 5, in which said adjusting gear is provided on both sides with gear sections, one of said gear sections being engaged with the resilient pawl of said adjusting lever and the other being engaged with the resilient pawl of said adjusting stopper.

8. An automated braking-gap adjuster system for mechanical drum brakes as recited in clwaim 5, in which said adjusting gear is provided on its one side and outer periphery with gear sections, one of said gear sections being engaged with the resilient pawl of said adjusting lever and the other being engaged with the resilient pawl of said adjusting stopper.

9. An automated braking-gap adjuster system for mechanical drum brakes, including a back plate, a pair of brake shoes having one end pivotally supported on the back plate, a cam member having a support member interposed between the other end of the brake shoes and adapted to be rotated by a brake arm, a wedge adjuster having its tapered cam surfaces taking sliding abutment upon the brake shoes, said adjuster being disposed in the cam member such that it is rotatable with the cam member and slidable at right angles to the direction of expansion of the brake shoes when braking, and a locating portion formed on the support member for the cam member, said locating portion locking a moving member in place to eliminate a gap between said cam member and the said wedge adjuster, whereby an initial position for said moving member is determined.

10. An automated braking-gap adjuster system for mechanical drum brakes as recited in claim 9, in which said support member is the back plate.

11. An automated braking-gap adjuster system for mechanical drum brakes as recited in claim 9 or 10, in which said locating portion is a projection.

12. An automated braking-gap adjuster system for mechanical drum brakes as recited in claim 9, in which said moving member is the cam member.

13. An automated braking-gap adjuster system for mechanical drum brakes as recited in claim 9, in which said moving member is the brake arm.

14. An automated braking-gap adjuster system for mechanical drum brakes as recited in claim 9, 12 or 13, in which said moving member is provided with a projection with which is engaged said locating portion.

15. An automated braking-gap adjuster system for mechanical drum brakes, including a back plate, a pair of brake shoes having one end pivotally supported on the back plate, a cam member interposed between the free ends of the brake shoes and adapted to be rotated by a brake arm, a wedge adjuster having cam surfaces, said adjuster being disposed in a hollow of the cam member such that it is rotatable with the cam member and slidable at right angles with the direction of expansion of the brake shoes when braking and said cam surfaces being engaged with the end faces of the brake shoes, a keep plate for the brake shoes which is attached to the back plate by mounting means to thereby permit the brake shoes to be movable only in the expanding direction, an adjusting rod abutting the wedge adjuster and threadedly connected to the cam member, and an adjusting gear rotated to extend said adjusting rod, so that said wedge adjuster is urged to thereby expand said brake shoes.

16. An automated braking-gap adjuster system for mechanical drum brakes as recited in claim 9 or 10, in which said locating portion is a recession.

17. An automated braking-gap adjuster system for mechanical drum brakes as recited in claim 9, 12 or 13, in which said moving member is provided with a recession with which is engaged said locating portion.

* * * * *